Patented Nov. 13, 1928.

1,691,221

UNITED STATES PATENT OFFICE.

RUDOLF BERNARD, OF BOCHUM, AND WALTER DEMANN, OF COLOGNE, GERMANY.

HYDROGENIZING TAR OIL.

No Drawing. Application filed June 25, 1925, Serial No. 39,500½, and in Germany June 30, 1924.

Our invention refers to the treatment of tar oils with a view to converting them into products having a different character, and more especially to the hydrogenization of these oils.

It is well known to those skilled in the art that tar oils can be hydrogenized at varying pressures and temperatures in the presence of a catalyst. It is further known that the reaction can be expedited by adding means such as for instance alkaline earth oxids having a dehydrating effect, and that the hydrogen can be replaced by gas mixtures containing more hydrogen than technical water gas which are obtained in the thermic decomposition of pit coal gas or coke oven gas (see for instance German Patent 321,908).

It is an object of our invention to replace the hydrogen by gas resulting in the manufacture of coke, which does not require any means for hydrogenizing under pressure. This is the more advantageous as a separate blower and a separate gas container would be particularly objectionable in connection with a coke oven.

We have ascertained that hydrogenation of tar oils can be obtained by means of technical gas resulting in the manufacture of coke at a pressure below 2 atm. provided that the gas was previously freed of water which is present therein in the form of water vapor. The presence of such water vapor must be avoided in the process of hyrogenation inasmuch as water vapor will be the cause of emulsification, which must be avoided by all means.

The gas resulting in the manufacture of coke and preferably used in this process normally contained 2.2% $CO_2$, 2.2% heavy hydrocarbons, 1.6% $O_2$, 4.8% $CO$, 47.7% $H_2$, 22.8% $CH_4$ and 18.9% $N_2$.

The tar oils preferably used were raw solvent naphtha, washing oil, anthracene oil and fatty tar oil, which is a thickened anthracene oil.

We can free the gas from water vapor in different ways, for instance by treating it with sulfuric acid, with calcium chloride or by refrigeration. We prefer employing sulfuric acid for the reason that this acid will at the same time cause the tarry constituents which would otherwise soil the final products to be converted into resinous bodies.

The water formed during the reaction being injurious to the catalyst and tending to render it inefficient, we prefer heating the oil to 180–200° C., thereby expelling the water from the oil and causing it to be carried along by the gas current. The gas will at the same time carry with it the volatile constituents possessing a disagreeable odor which are always contained in the oil and are partly formed during desulfurization, and the gas will thereafter return to the suction main with increased heating and illuminating power. Provided that the catalyst be well distributed in the oil at a great number of points all over the cross sectional area of the reaction vessel hydrogenation can be carried through to any desired extent in a layer of oil 5–7 cms. high.

Inasmuch as the sulfur contained in the oil would be injurious owing to the odor it imparts to the final product and to the deleterious action it exerts on the catalyst by splitting off hydrogen sulfide, we first desulfurize the oil. To this end we preferably heat it in a manner well known per se during 1–3 hours to about 150–200° C. in the presence of iron sulfate or bog iron ore.

*Example 1.*

500 parts by weight of tar oil desulfurized with 30–70 parts iron sulfate or 50–75 parts bog iron ore are filtered and the oil which has previously been freed of water, for instance by distillation, is introduced into a larger vessel in which it forms a layer about 6 cms. high. A gas supply pipe connected with the pressure conduit extends down to the bottom of the vessel, another pipe, which allows the gas to escape from the vessel, is connected to the suction main. As a catalyst we prefer using the colloidal nickel catalyst described more particularly on page 25 of Chemiker Zeitung 1924 and consisting of finely divided metallic nickel precipitated by means of hydrogen on kieselguhr or ground pumice stone, this catalyst having been reduced at 310° C. in a tar oil fraction distilled over between 375 and 390° C. After an 8 hours' treatment at 180–200° C. the oil showed a weak agreeable odor and, in spite of a marked loss of volatile constituents, showed an increase in weight of 10 parts; its boiling point was materially reduced.

As mentioned above, raw solvent naphtha can also be treated with advantage according to the present invention. In hydrogenizing raw solevent naphtha we aim at reducing the percentage of non-satuarated compounds which, on the light oil being treated with sulfuric acid, are converted into resinous products and lessen the yield of refined solvent naphtha. By partly or entirely saturating these non-saturated compounds the quantity of acid required for refining (washing) the raw oil is reduced, and further the loss arising in the washing procedure is reduced from 14–18% to 5–7%, while the contents of resinifying substances drops from about 6% to 2–3%.

In contradistinction to the heavier tar oils the hydrogenation of raw solvent naphtha is effected without first desulfurizing it, for neither iron sulfate nor bog iron ore would materially reduce its contents of sulfur. The liquid is heated to 130–140° C. and, after adding the catalyst, the gas is conducted through the oil in a slow current. After the lapse of 6 to 10 hours the hydrogenation has come to an end. The gas leaving the reaction vessel contains benzene in solution, and in working on a large scale this case should therefore be conducted to the scrubbers in order there to free it from benzene by washing with washing oil. The hydrogenized product does not contain more than 2–3% of bodies resinifiable by concentrated sulfuric acid and therefore requires only one half of the concentrated acid which is required for washing in ordinary cases.

We have further succeeded in employing this process for obtaining an increased yield of light colored oils possessing a very weak odor by proceeding in the following manner.

As is well known, tar oils can almost be freed from the odor adhering to them at a temperature above 100° but below their boiling point by treating them with steam which is preferably superheated (see German specification 333,091). We have now ascertained that by treating with superheated steam at 180°–200° C. the product obtained by hydrogenizing tar oil with gas resulting in the manufacture of coke we succeed not only in altogether discarding the odor which may still adhere to the product, but we also obtain a yield of 30–55% of a clear-colored oil. This is an unexpected result inasmuch as by treating ordinary tar oil in accordance with the process described in German specification 333,091 not more than 10% of an oil can be obtained which possesses a strong odor, this oil moreover still containing voltatile constitutents. In contradistinction thereto we obtain a clear-colored oil, the color of which when exposed to the air changes only very little and which, as shown by its odor, color and yield, has an altogether different composition.

*Example 2.*

100 grams of the product obtained by hydrogenizing tar oil with gas resulting in the manufacture of coke, as above described, are distilled exhaustively with steam superheated to about 175° C., the oil being kept at a temperature rising gradually from 180 to 200° C. In this treatment there results an oil having the color of olive oil, a very weak odor and a specific gravity higher than water. According to the duration of hydrogenation and to the composition of the raw oil, a yield of 30–55% is obtained. This oil can easily be separated from the water, and there remains in it still a highly viscous residue which can be used in the manufacture of solid lubricants and lubricating oils.

We wish it to be understood that we do not desire to be limited to the exact details and working conditions nor to the exact substances and sequence of operations above described, for obvious modifications will occur to a person skilled in the art.

We claim:—

1. The method of hydrogenizing tar oil comprising heating the oil to a temperature approaching its boiling point and treating same in the presence of a colloidal nickel catalyst with the dry gas resulting during the manufacturing of coke, this gas being under the normal pressure prevailing in a coke oven, said catalyst being prepared by reduction at 310° C. with that part of said oil which boils between 375 and 390° C.

2. The method of hydrogenizing tar oil comprising thereafter heating the oil to a temperature approaching its boiling point and treating same in the presence of a catalyst with the dry gas resulting during the manufacture of coke after having treated same with sulfuric acid of about 60° Baumé, this gas being under the normal pressure prevailing in a coke oven.

3. The method of hydrogenizing tar oil comprising heating the oil to a temperature approaching its boiling point, treating same in the presence of a catalyst with the dry gas resulting during the manufacture of coke, this gas being under the normal pressure prevailing in a coke oven and introducing into the oil thus treated steam superheated to 180–200° C.

In testimony whereof we affix our signatures.

RUDOLF BERNHARD.
WALTER DEMANN.